US009461699B2

(12) United States Patent (10) Patent No.: US 9,461,699 B2
Willenegger (45) Date of Patent: Oct. 4, 2016

(54) METHOD AND SYSTEM FOR DATA AND VOICE TRANSMISSION OVER SHARED AND DEDICATED CHANNELS

(75) Inventor: Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/328,791

(22) Filed: Jan. 9, 2006

(65) Prior Publication Data

US 2006/0109890 A1 May 25, 2006

Related U.S. Application Data

(63) Continuation of application No. 09/748,315, filed on Dec. 22, 2000, now Pat. No. 6,985,510.

(51) Int. Cl.
*H04W 74/00* (2009.01)
*H04B 1/707* (2011.01)

(52) U.S. Cl.
CPC .......... *H04B 1/707* (2013.01); *H04W 74/006* (2013.01); *H04B 2201/70701* (2013.01); *H04B 2201/70703* (2013.01)

(58) Field of Classification Search
CPC ........... H04W 74/002; H04W 74/006; H04W 74/008; H04B 1/7007; H04B 2201/70701; H04B 2201/70703; H04B 1/69; H04B 2001/70724
USPC ............... 370/209, 320, 335, 342, 441, 522, 370/411–418; 375/130, 141, 259–260, 140, 375/146–147, 295
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,173,898 A * | 12/1992 | Heinzmann ........... | H04L 12/417 370/440 |
| 5,307,348 A * | 4/1994 | Buchholz et al. ............ | 370/348 |
| 5,485,459 A | 1/1996 | Van Steenbrugge | |
| 5,831,978 A * | 11/1998 | Willars et al. ................ | 370/335 |
| 6,173,005 B1 * | 1/2001 | Kotzin et al. ................. | 375/141 |
| 6,185,199 B1 * | 2/2001 | Zehavi .......................... | 370/335 |
| 6,222,875 B1 * | 4/2001 | Dahlman et al. ............. | 375/130 |
| 6,275,739 B1 * | 8/2001 | Ireland ................... | A63H 19/00 105/1.5 |
| 6,359,865 B1 * | 3/2002 | Toskala et al. ............... | 370/329 |
| 6,388,583 B1 | 5/2002 | Long et al. | |
| 6,438,717 B1 | 8/2002 | Butler et al. | |
| 6,466,610 B1 * | 10/2002 | Schilling ....................... | 375/141 |
| 6,480,480 B1 * | 11/2002 | Du ..................... | H04L 12/40156 370/312 |
| 6,542,730 B1 | 4/2003 | Hosain | |

(Continued)

*Primary Examiner* — Jean B Corrielus
(74) *Attorney, Agent, or Firm* — Charles Chesney (57) ABSTRACT

In one disclosed embodiment, data information is stored in a buffer in a transmitter. The data information is transmitted on a shared channel and control information for recovering the associated data information is transmitted on a dedicated channel. The shared and dedicated channels can be, for example, different portions of the frequency band. The control information can include a spreading factor used to spread the data at the transmitter. For example, the spreading factor can be the length of the Walsh function orthogonal coding used to spread the data. The control information is received over the dedicated channel before the associated data information is received over the shared channel. The control information is then used to recover the associated data information. For example, knowing the spreading factor from the control information, the correct Walsh function can be selected to de-spread, i.e. to Walsh de-cover, the data information.

18 Claims, 5 Drawing Sheets

(56) References Cited

U.S. PATENT DOCUMENTS

| | | | |
|---|---|---|---|
| 6,574,211 B2 | 6/2003 | Padovani et al. | |
| 6,594,248 B1* | 7/2003 | Karna et al. | 370/342 |
| 6,625,138 B2* | 9/2003 | Karna et al. | 370/342 |
| 6,754,505 B1* | 6/2004 | Baker et al. | 455/522 |
| 6,785,300 B2* | 8/2004 | Hoole | 370/519 |
| 6,985,510 B2 | 1/2006 | Willenegger | |
| 7,065,055 B1* | 6/2006 | Karlsson et al. | 370/282 |
| 7,643,540 B2* | 1/2010 | Song | 375/149 |
| 2005/0020296 A1* | 1/2005 | Baker et al. | 455/522 |

* cited by examiner

FIG. 1

--PRIOR ART--

FIG. 2

--PRIOR ART--

METHOD AND SYSTEM FOR DATA AND VOICE TRANSMISSION OVER SHARED AND DEDICATED CHANNELS

CLAIM OF PRIORITY UNDER 35 U.S.C. §120

The present Application for Patent is a Continuation and claims priority to patent application Ser. No. 09/748,315 entitled "Method and System for Data and Voice Transmission Over Shared and Dedicated Channels" filed Dec. 22, 2000, now U.S. Pat. No. 6,985,510, and assigned to the assignee hereof and hereby expressly incorporated by reference herein.

BACKGROUND OF THE INVENTION

1. Field of the Invention

The present invention generally relates to the field of wireless communication systems. More specifically, the invention relates to mixed voice and data transmission for wideband code division multiple access communication systems.

2. Related Art

In a wideband code division multiple access ("WCDMA") communication system, transmission is provided for voice communication and data communication simultaneously by transmitting voice and data signals across one or more communication channels. Voice communication and data communication differ in their signal characteristics. For example, voice communications tend to comprise signals which have relatively low information rates, i.e. bit rates, and which are relatively continuous in the sense that the bit rates vary over a limited range of values. Data communications, on the other hand, tend to comprise signals which have a relatively high bit rate and occur discontinuously in time, i.e., in short "bursts" of data at high bit rates separated by periods of relative inactivity, or quiet, in which the data bit rate is low. In order to provide efficient transmission for these different types of communication signals, different communication channels can be provided for each type of communication signal. One way to provide different communication channels is to specify a different part of the frequency spectrum, i.e. a different "band" of frequencies or frequency band, for each different channel.

Efficient use of limited bandwidth of the communication channels is improved by providing a "shared channel" for multiple users to transmit data signals and also providing a "dedicated channel" for transmitting control signals regarding the data information on the shared channel and also for transmitting voice signals. The dedicated channel is always "on," i.e. transmitting voice and control information at a relatively low bit rate. In this way, a data user can "listen" to the dedicated channel, or be signaled over it, to find out whether to receive data from the shared channel. Thus, the different types of communication signals can be segregated into different channels. By segregating the data signals into a shared channel, channel resources in the dedicated channel can be allocated more efficiently. For example, if data communication signals were sent over the dedicated channel various limited channel resources, such as orthogonal spreading codes—further discussed below—would be allocated to the relatively quiet periods as well as to the bursts. Such allocation is wasteful compared to the allocation of channel resources to communications which occur at a relatively constant rate, such as control signals and voice communications. Thus it is more efficient to restrict the dedicated channel to those communications which occur in a limited range of bit rates, such as control signals and voice communications.

Furthermore, by segregating the data signals of multiple users into a shared channel, channel resources in the shared channel also can be allocated more efficiently. For example, channel resources, such as orthogonal spreading codes, can be allocated in a way that takes advantage of the bursts in the data signals to make transmission of the signals more efficient. One way to allocate orthogonal spreading codes to make signal transmission more efficient is to vary the length of the codes and thereby vary the amount of spreading which is performed.

Figure 1:
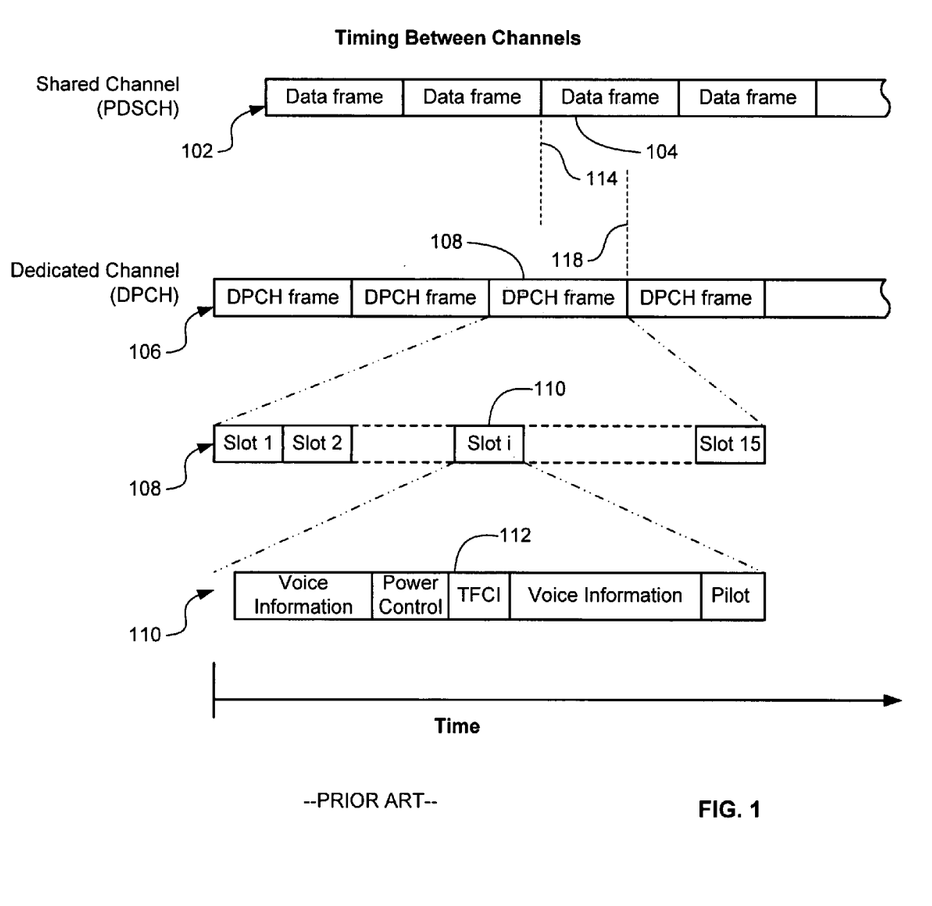
FIG. 1 illustrates one example of a timing relationship between shared and dedicated channels in an exemplary communication system.

FIG. 1 illustrates an example of a timing relation between communication channels. FIG. 1 shows shared channel 102, for multiple user transmission of data signals, in schematic form as a sequence of data frames. Data frame 104, for example, contains data information from one specific user. Shared channel 102 is also referred to as a "physical downlink shared channel" (PDSCH) as indicated in FIG. 1. FIG. 1 also shows dedicated channel 106, also referred to as a "dedicated physical channel" (DPCH), for transmitting control signals regarding the data information on the shared channel and also for transmitting voice signals. Channel 106 is also shown in schematic form as a sequence of "DPCH" frames. DPCH frame 108, for example, contains control signal and other information regarding the data information in associated data frame 104.

Each DPCH frame is formatted as a series of "slots." FIG. 1 shows DPCH frame 108, for example, in expanded form as series 108 of several slots. Each slot in example series 108 can further be shown in expanded form. For example, the i'th slot 110 of series 108 where i ranges between 1 and 15 corresponding to the number of slots in series 108, is shown in expanded form as slot 110. Slot 110 contains information comprising voice and possibly other information, indicated as "voice information" in slot 110; power control information, indicated as "power control" in slot 110; pilot information, indicated as "pilot" in slot 110; and TFCI ("transport format combination indicator") 112, indicated as "TFCI" in slot 110. Thus each DPCH frame, and in particular, DPCH frame 108, contains TFCI information, such as TFCI 112, which is spread throughout each DPCH frame in slots, such as slot 110.

As stated above, one way to allocate orthogonal spreading codes to make signal transmission more efficient is to vary the amount of spreading which is performed, i.e. change the spreading factor from frame to frame as data frames are transmitted on shared channel 102. Continuing with FIG. 1, the TFCI in each slot, such as TFCI 112 in slot 110, includes spreading factor information for associated data frame 104. Thus, data frame 104 cannot be de-spread using orthogonal codes until the spreading factor information has been received from a TFCI, that is, until the complete associated DPCH frame 108 has been received. FIG. 1 shows that the beginning of data frame 104, marked by dashed line 114, is received before the end of associated DPCH frame 108, marked by dashed line 118. Thus, as shown in FIG. 1, DPCH frame 108 and associated data frame 104 are transmitted approximately simultaneously.

Figure 2:
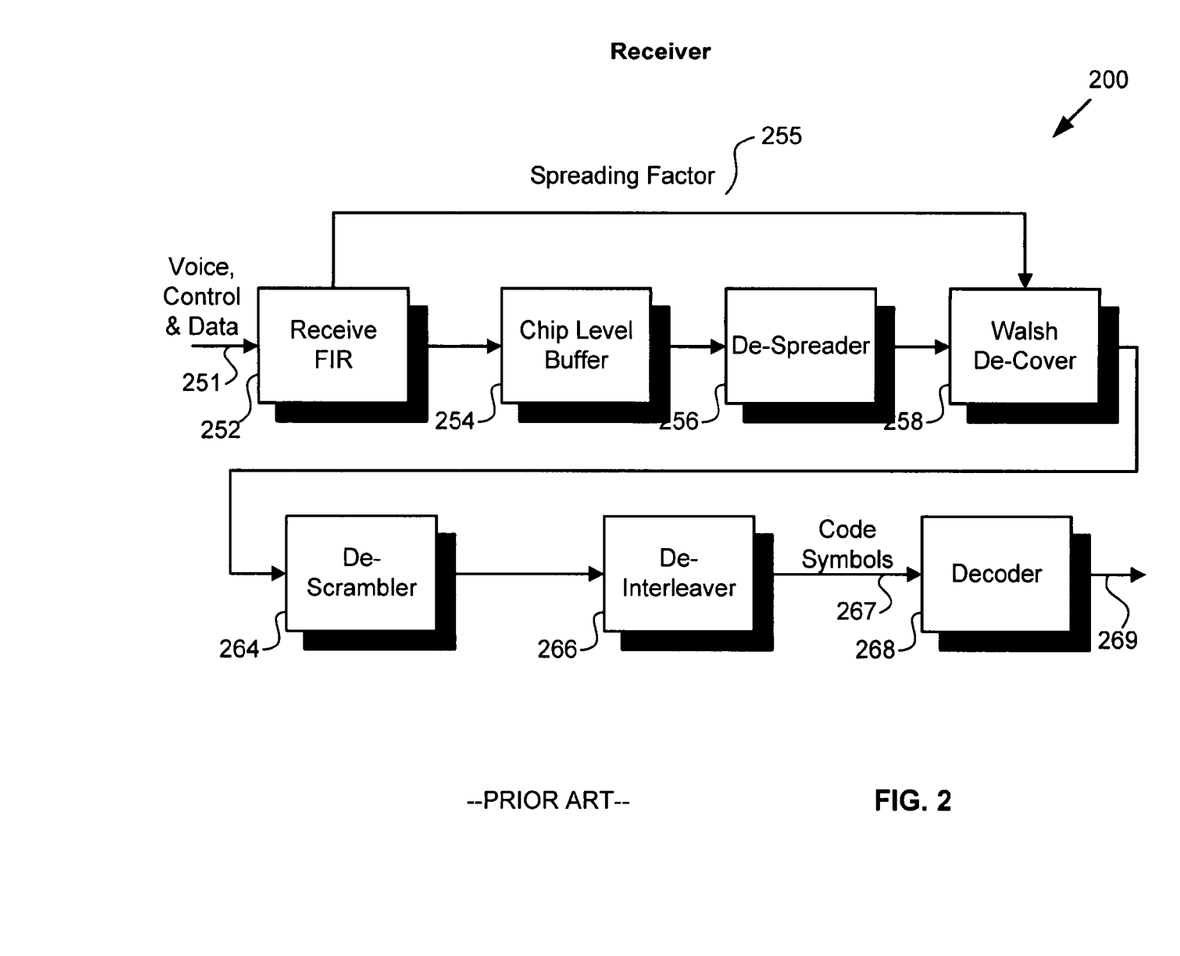
FIG. 2 illustrates, in block diagram form, an example of information reception and decoding for a WCDMA communication system.

FIG. 2 illustrates an example of how voice, control, and data information can be received in a WCDMA or spread spectrum communications system. Exemplary system 200 shown in FIG. 2 constitutes part of a receiver which may generally reside in a subscriber unit when the communication is taking place in a downlink channel. In exemplary system 200 shown in FIG. 2, receive FIR 252 receives signal 251, containing voice and control information and data. Signal 251 is transmitted to receive FIR 252 across communication channels, which can be shared channel 102 and dedicated channel 106 shown in FIG. 1.

Continuing with FIG. 2, shared channel data from receive FIR 252 is provided to chip level buffer 254. Chip level buffer 254 is used to store the shared channel data until the TFCI information, which includes the spreading factor information, is received from the associated DPCH frame that is transmitted approximately simultaneously on the dedicated channel. As a result of spreading, each data symbol is represented by several bits of signal information, called chips, in the transmitted signal. Spreading the data symbols into chips, using various forms of coding, for example, can spread the data by a factor of 1,000 or more, i.e., each data symbol is represented by 1,000 chips in the transmitted signal. Thus, the amount of storage needed to store the data as chips in chip level buffer 254 can typically be on the order of one thousand times the amount of storage needed to store the original data as symbols before coding, i.e., at the symbol level, before transmission.

Only after TFCI information has been completely received, data chips are passed from chip level buffer 254 to de-spreader 256 and Walsh de-cover 258. De-spreader 256 "de-spreads" the PN (pseudo-noise) spreading provided at the transmitter. Output of de-spreader 256 is passed to Walsh de-cover 258. Walsh de-cover 258 "undoes" the orthogonal spreading applied to the data at the transmitter. In this example, the particular type of orthogonal spreading is called "Walsh covering." Thus, Walsh de-cover 258 restores the data to its condition at the transmitter before orthogonal spreading, i.e., Walsh covering, was applied. Walsh de-cover 258 restores the data by applying the inverse function of the original Walsh function spreading. Walsh de-cover 258 uses spreading factor 255 to determine the correct inverse function to use to de-spread, or de-cover, the data chips. Spreading factor 255 is fed to Walsh de-cover 258 as soon as it is available at the receiver. Chip level buffer 254 provides a time delay to allow input of spreading factor 255 to Walsh de-cover 258 before output of de-spreader 256 is passed to Walsh de-cover 258.

The output of Walsh de-cover 258, which is a sequence of symbols, is then passed to de-scrambler 264. De-scrambler 264 de-scrambles the sequence of symbols by inverting the operations used to scramble them. The de-scrambled symbol sequence is passed on to de-interleaver 266. De-interleaver 266 undoes the interleaving performed at the transmitter on code symbol sequences. Thus, the output of de-interleaver 266 is code symbol sequence 267 comprising an encoded sequence of symbols. Code symbol sequence 267 should ideally be the same as the original code symbol sequence that was interleaved at the transmitter. The output of de-interleaver 266, i.e. code symbol sequence 267, is passed on to decoder 268. The output of decoder 268 is user information sequence 269, which ideally is identical to the original user information sequence that was transmitted. Thus, FIG. 2 illustrates an example of reception and recovery of a user's information signal, which may include voice, control, and data information, using both dedicated and shared communication channels.

Because the control information is transmitted simultaneously with the data information, as discussed above in relation to FIG. 1, the data information must be stored at the receiver in its spread form, i.e., as chips, until the control information necessary to de-spread the chips into symbols is received. The de-spreading must be accomplished before further processing can commence for recovering the data in its original form. Thus, according to the techniques described in relation to FIG. 1 and FIG. 2, there is an inherent processing delay at the receiver. Further, because the data information must be stored at the chip level, i.e., as chips, a relatively large buffer must be used. As noted above, a chip level buffer can typically be 1,000 times larger than a symbol level buffer which stores the same data information. The downlink receiver for WCDMA systems is typically in the terminal unit, which is typically a small portable unit that is constrained to be efficient and to have low power consumption. Thus, extra buffer and processing power requirements for the terminal unit constitute a severe disadvantage.

Thus, there is a need in the art for transmitting voice, control, and data information without causing a processing delay at the receiver. There is also a need in the art for transmitting voice, control, and data information which does not require excessive storage space at the receiver.

SUMMARY OF THE INVENTION

The present invention is directed to a method and system for data and voice transmission over shared and dedicated channels. According to the invention, voice, control, and data information are transmitted without causing a processing delay at the receiver associated with the recovery of the data information. Moreover, according to the invention, voice, control, and data information are transmitted without requiring excessive storage space at the receiver.

In one aspect of the invention data information is stored in a buffer in a transmitter. The data information is transmitted on a shared channel and control information for recovering the associated data information is transmitted on a dedicated channel. The shared and dedicated channels can be, for example, different frequency bands. The control information can include a spreading factor used to spread the data at the transmitter. For example, the spreading factor can be the length of the Walsh function orthogonal coding used to spread the data.

The control information is received over the dedicated channel before the associated data information is received over the shared channel. The control information is then used to recover the associated data information. For example, knowing the spreading factor from the control information, the correct Walsh function can be selected to de-spread, i.e. to Walsh de-cover, the data information.

DETAILED DESCRIPTION OF THE PREFERRED EMBODIMENTS

The presently disclosed embodiments are directed to a method and system for data and voice transmission over shared and dedicated channels. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 3:
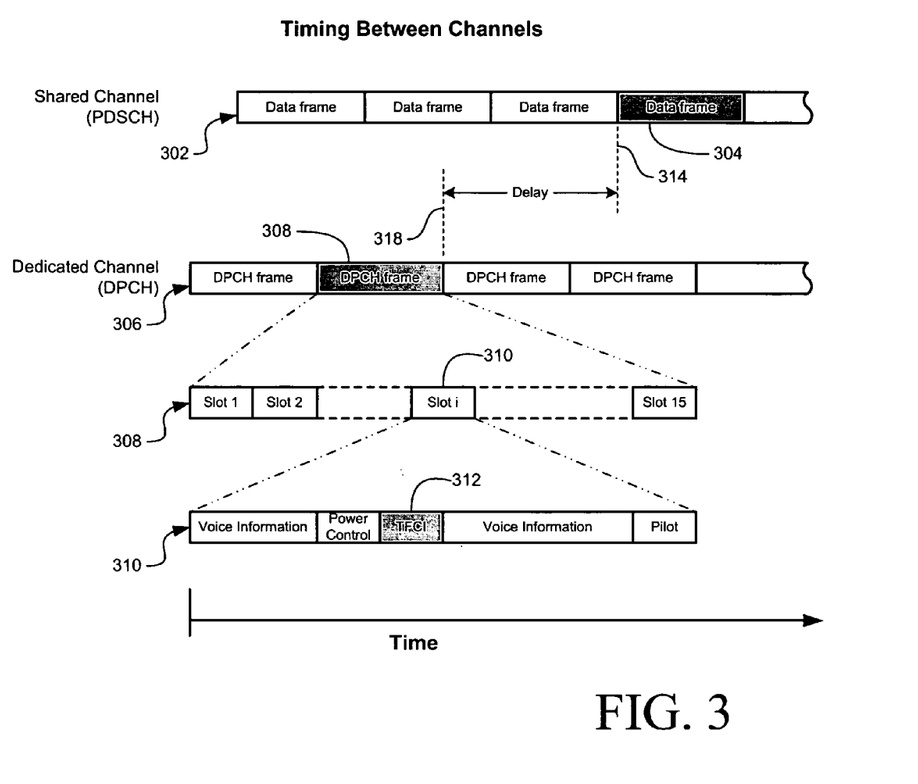
FIG. 3 illustrates one example of a timing relationship between shared and dedicated channels for one embodiment of the present invention in an exemplary communication system.

FIG. 3 illustrates an example of a timing relation between communication channels in accordance with one embodiment. FIG. 3 shows shared channel 302, for multiple user transmission of data signals, in schematic form as a sequence of data frames. Data frame 304, for example, contains data information in the form of a sequence of output chips, as discussed above, from one specific user. Shared channel 302 is also referred to as a "physical downlink shared channel" (PDSCH) as indicated in FIG. 3. FIG. 3 also shows dedicated channel 306, also referred to as a "dedicated physical channel" (DPCH), for transmitting control signals regarding the data information on the shared channel and also for transmitting voice signals. Channel 306 is also shown in schematic form as a sequence of DPCH frames. DPCH frame 308, for example, contains control and other information in the form of chips. Each DPCH frame is formatted as a series of "slots."

FIG. 3 shows DPCH frame 308, for example, in expanded form as series 308 of slots. Each slot in example series 308 can further be shown in expanded form. For example, the i'th slot 310 of series 308 where i ranges between 1 and 15 corresponding to the number of slots in series 308, is shown in expanded form as slot 310. Slot 310 contains information chips comprising voice and possibly other information, indicated as "voice information" in slot 310; power control information, indicated as "power control" in slot 310; pilot information, indicated as "pilot" in slot 310; and TFCI ("transport format combination indicator") 312, indicated as "TFCI" in slot 310. Thus each DPCH frame, in particular DPCH frame 308, contains TFCI information, such as TFCI 312, which is spread throughout each DPCH frame in slots, such as slot 310. In the present application, the information contained in TFCI 312 and power control information are also generally referred to as "control information" contained within a "control frame." Moreover, the "voice information" in each slot, such as "voice information" in slot 310 shown in FIG. 3, is also referred to as a "voice frame" in the present application.

As stated above, one way to allocate orthogonal spreading codes to make signal transmission more efficient is to vary the amount of spreading which is performed, i.e. change the spreading factor from frame to frame as data frames are transmitted on shared channel 302. By way of background, in WCDMA communications, the user's communication signal is spread to allow many users to simultaneously use the same bandwidth without significantly interfering with one another. One means of spreading is the application of distinct "orthogonal" spreading codes or functions, such as Walsh functions, to each user's communication signal. "Orthogonality" refers to lack of correlation between the spreading functions. In a given spread spectrum communication system using Walsh functions (also called Walsh code sequences), a pre-defined Walsh function matrix having n rows of n chips each is established in advance to define the different Walsh functions to be used to distinguish different user's communication signals. As an example, for a given sector (in WCDMA, each sector is a subset of a cell), each downlink channel is assigned a distinct Walsh function. In other words, communications between a base station and each user are coded by a distinct Walsh code sequence in order to separate each user from the others.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. Pat. No. 6,574,211 entitled "Method and Apparatus for High Rate Packet Data Transmission" issued Jun. 3, 2003, and assigned to the assignee of the present invention. The disclosure in that patent is also hereby fully incorporated by reference into the present application.

A Walsh function having n rows of n chips each is also referred to as a Walsh function matrix of order n. An example of a Walsh function matrix where n is equal to 4, i.e. a Walsh function matrix of order 4, is shown below:

$$\begin{pmatrix} 1 & 1 & 1 & 1 \\ 1 & 0 & 1 & 0 \\ 1 & 1 & 0 & 0 \\ 1 & 0 & 0 & 1 \end{pmatrix}$$

In the above example, there are 4 Walsh functions, each function having 4 chips. Each Walsh function is one row in the above Walsh function matrix. For example, the second row of the Walsh function matrix is the Walsh function having the sequence 1, 0, 1, 0. It is seen that each Walsh function, i.e. each row in the above matrix, has zero correlation with any other row in the matrix. Stated differently, exactly half of the chips in every Walsh function differ from those in every other Walsh function in the matrix.

Application of distinct orthogonal spreading functions, such as Walsh functions, to each user's communication signal results in a transformation of each symbol of data in the user's communication signal into a respective sequence of output chips, where each sequence of output chips is orthogonal with every other sequence of output chips. Using Walsh functions, the transformation can be performed by XOR'ing each symbol of data in the user's communication signal with a sequence of chips in a particular Walsh function. Using the second Walsh function in the above example, i.e. the second row of the matrix, and XOR'ing a user's data symbol of "a" with the second row of the matrix results in the sequence of output chips: ā, a, ā, a, where "ā" denotes the binary complement of a. Thus, in this illustrative example, each data symbol is spread into a sequence of output chips having a length of 4. The number of output chips produced for each input data symbol is called the spreading factor; in this illustrative example, the spreading factor is 4. In practice, Walsh functions of length 4 to 512 (i.e. Walsh functions having from 4 to 512 chips in each Walsh code sequence) are used. Thus, spreading factors may range from 4 to 512 in practice.

Continuing with FIG. 3, the TFCI in each slot, such as TFCI 312 in slot 310 includes spreading factor information for associated data frame 304. In other embodiments, the TFCI in each slot, such as TFCI 312 in slot 310 could contain other types of control information, such as data rate, for example. FIG. 3 shows that the beginning of data frame 304, marked by dashed line 314, is received well after the end of associated DPCH frame 308, marked by dashed line 318. Thus, there is a time delay between the end of DPCH frame 308 and the beginning of associated data frame 304. For example, the time delay can be in a range from 3 to 18 slots. Where 15 slots fill a frame lasting 10 milliseconds (msec), the delay is approximately from 2.0 msec to 12.0 msec.

The delay is long enough for the spreading factor information to be extracted from TFCI 312 before reception of associated data frame 304. Thus, de-spreading or Walsh de-covering can begin on data frame 304 immediately as data frame 304 begins to be received because the spreading factor information, transmitted in advance in DPCH frame 308, is immediately available when data frame 304 begins to be received.

Figure 4:
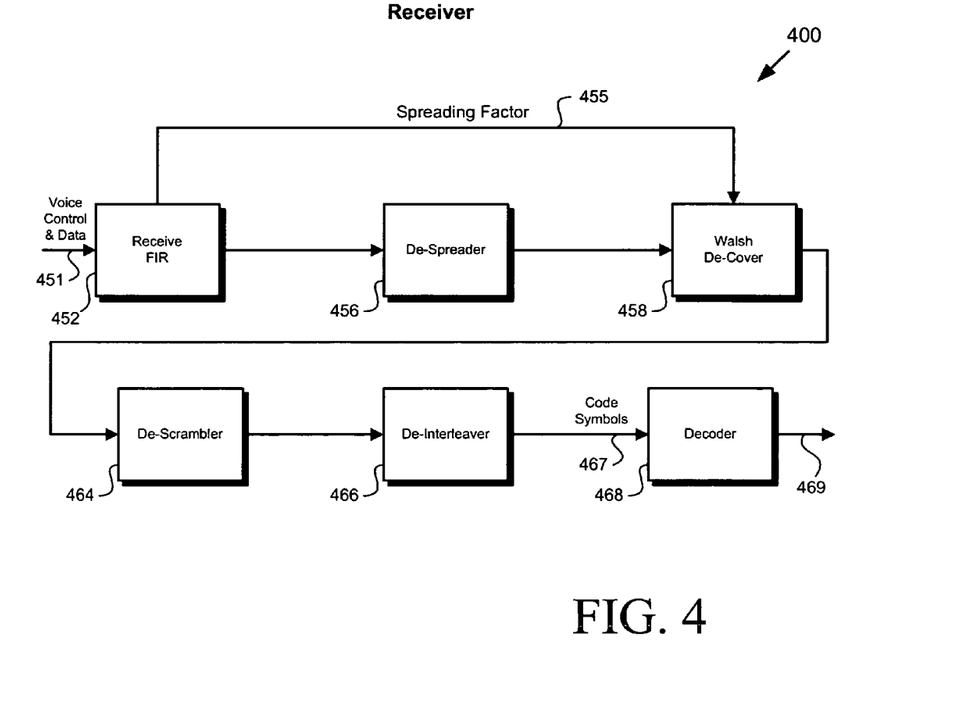
FIG. 4 illustrates, in block diagram form, an example of information reception and decoding for one embodiment of the present invention in an exemplary receiver.

FIG. 4 illustrates an example of how data can be received in a WCDMA or spread spectrum communications system in accordance with one embodiment. Exemplary system 400 shown in FIG. 4 constitutes part of a receiver which may generally reside in a subscriber unit when communication is taking place in a downlink channel. In exemplary system 400 shown in FIG. 4, receive FIR 452 receives signal 451, containing voice and control information and data. Signal 451 is transmitted to receive FIR 452 across communication channels, which can be shared channel 302 and dedicated channel 306 shown in FIG. 3.

Continuing with FIG. 4, shared channel data in the form of chips output from receive FIR 452 is provided directly to de-spreader 456. No chip level buffer is needed due to the timing relation between the shared and dedicated channels as shown in FIG. 3. Because the control information contained in DPCH frame 308 is received well ahead of associated data frame 304, spreading factor 455 is immediately available to Walsh de-cover 458. Thus, data does not need to be buffered at the chip level to provide a delay for extracting and feeding spreading factor 455 to Walsh de-cover 458.

Continuing with FIG. 4, output of de-spreader 456 is passed to Walsh de-cover 458. Spreading factor 455 is fed to Walsh de-cover 458 in advance due to the timing relation between the shared and dedicated channels, as discussed above. Walsh de-cover 458 uses spreading factor 455 to determine the correct inverse function to use to de-spread, or de-cover, the data chips. Walsh de-cover 458 de-spreads the data chips—i.e., undoes the Walsh function spreading—by applying the inverse function of the original Walsh function spreading. Returning to the example used above (which has a spreading factor of 4), the second row of the matrix, 1, 0, 1, 0, is again XOR'ed to the sequence of output chips, ā, a, ā, a, to produce the data symbol sequence a, a, a, a, and thus the de-spread data symbol is "a", the original input data symbol.

The output of Walsh de-cover 458, which is a sequence of symbols, is then passed to de-scrambler 464. De-scrambler 464 de-scrambles the sequence of symbols by inverting the operations used to scramble them. In other words, de-scrambler 464 uses the same user specific mask and long code PN sequence used to scramble the original sequence, in order to de-scramble the sequence of symbols.

The de-scrambled symbol sequence is passed on to de-interleaver 466. De-interleaver 466 undoes the interleaving performed at the transmitter on code symbol sequences. Thus, the output of de-interleaver 466 is code symbol sequence 467 comprising an encoded, but de-interleaved, sequence of symbols. Code symbol sequence 467 should ideally be the same as the original code symbol sequence that was interleaved at the transmitter. The output of de-interleaver 466, i.e. code symbol sequence 467, is passed on to decoder 468.

Code symbol sequence 467 is input to decoder 468, which can be, for example, a Viterbi decoder. Due to imperfections in the communication channel, code symbol sequence 467 may not be the same as the original code symbol sequence that was interleaved at the transmitter. Viterbi decoder 468 provides maximum likelihood detection of code symbol sequences. Simply stated, maximum likelihood detection determines a valid code symbol sequence that is most likely to have produced code symbol sequence 467 that is received by Viterbi decoder 468. Thus, given code symbol sequence 467, Viterbi decoder 468 determines a "best estimate" of the original code symbol sequence and decodes the best estimate into user information sequence 469. Because the best estimate is used, user information sequence 469 contains a minimal number of errors in comparison to the original information transmitted. Thus, FIG. 4 illustrates an example of efficient reception and recovery of a user's communication signal, which may include both voice and data information, using both dedicated and shared communication channels.

Figure 5:
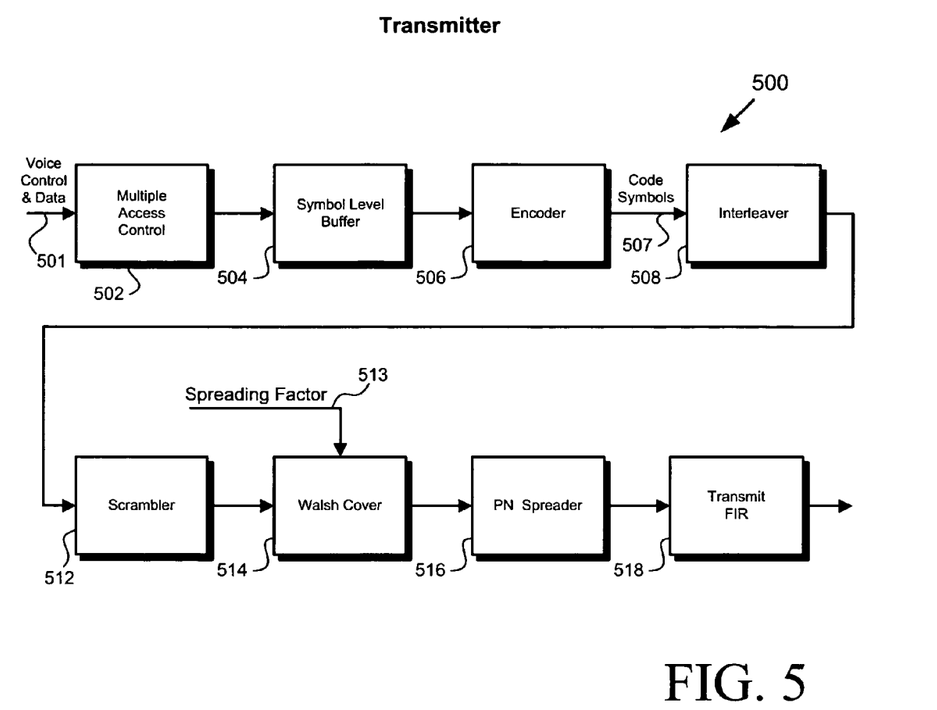
FIG. 5 illustrates, in block diagram form, an example of information coding and transmission for one embodiment of the present invention in an exemplary transmitter.

FIG. 5 illustrates an example transmitter for transmission of data at varying spreading factors and data rates for a WCDMA or spread spectrum communications system. The exemplary system 500 shown in FIG. 5 constitutes part of a transmitter which may generally reside in a base station, gateway, or satellite repeater when communication is taking place in a downlink channel.

In exemplary system 500 shown in FIG. 5, input 501 contains the user's communication signal including voice and control information and data to be transmitted across communication channels, which can be shared channel 302 and dedicated channel 306 shown in FIG. 3, to a receiver, which can be exemplary system 400 shown in FIG. 4. Input 501 is delivered to multiple access control 502. Multiple access control 502 allocates and schedules access to the communication channels among multiple users.

The user's communication signal is passed from multiple access control 502 to symbol level buffer 504. Symbol level buffer 504 is used to create a time delay between the data portions and the control information portions of the user's communication signal. In other words, the portion of the user's communication signal that is to be transmitted over the dedicated channel, including spreading factor information, is encoded and transmitted immediately, while the portion of the user's communication signal that is to be transmitted over the shared channel is held in symbol level buffer 504 for a specific amount of time, to create a desired time delay, before being encoded and transmitted. As discussed above, the time delay allows the receiver, such as exemplary system 400 shown in FIG. 4, to recover the spreading factor information from the dedicated channel so that de-spreading of data on the shared channel can be performed as the data on the shared channel is received, which results in elimination of the chip level buffer at the receiver. Note that no encoding or spreading of the user's communication signal has been performed prior to storing the user's communication signal information in symbol level buffer 504. As noted above, buffering at the symbol level typically requires on the order of one thousand times less storage space than buffering at the chip level. Thus, in addition to providing the time delay, symbol level buffer 504 also provides more efficient information storage.

The user's communication signal is passed from symbol level buffer 504 to encoder 506, which may be a block encoder or convolutional encoder or a combination of encoders. The redundancy introduced by encoder 506 enables the receiver to correct some detection errors without the need to increase transmission power. Encoder 506 outputs code symbol sequence 507, generally referred to as "code symbols." Interleaver 508 receives code symbol sequence 507 from encoder 506 and interleaves the code symbols. In exemplary system 500 in FIG. 5, interleaver 508 may be a block interleaver or a convolutional interleaver, which are both known in the art. The interleaved code symbols are passed on to scrambler 512. Scrambler 512 provides a unique scrambling for each user's communication signal as discussed above.

The data portion of the user's communication signal is transmitted at varying spreading factors and rates. Spreading factor 513, which is variable from frame to frame of data transmitted, is used to determine, as discussed above, the Walsh spreading of the user's data in the shared channel. Therefore, spreading factor 513 is input to Walsh cover 514 for use by Walsh cover 514 in spreading the user's data. The output of Walsh cover 514 is also referred to as "spread data information" in the present application. As stated above, spreading factor 513 is also transmitted to the receiver across the dedicated channel for use by the receiver in de-spreading the user's data.

As shown in FIG. 5, spreading factor 513 and the symbol sequence output by scrambler 512 is input to Walsh cover 514. Walsh cover 514 uses spreading factor 513 to select the appropriate Walsh function to use to Walsh cover (or spread) each symbol of the data frame to be transmitted over the shared channel. The Walsh covered data frame containing the user's data is then passed to PN spreader 516. PN spreader 516 further spreads the data as previously discussed.

The output chip sequence of PN spreader 516 is passed on to "transmit FIR" 518. Transmit FIR 518 is typically an FIR filter used for pulse shaping signals prior to their transmission over a communication channel. The output signal of transmit FIR 518 is sent across communication channels, for example, shared channel 302 and dedicated channel 306, to a receiver, such as exemplary system 400 shown in FIG. 4.

It is appreciated by the above description that the invention provides a method and system for coordinating control information and despreading of data by providing efficient buffering and data recovery processing for shared channel communications in a WCDMA system. According to an embodiment of the invention described above, voice, control, and data information are transmitted without causing a processing delay at the receiver associated with the recovery of the data information. Moreover, according to the embodiment of the invention described above, voice, control, and data information are transmitted without requiring excessive storage space at the receiver. Although the invention is described as applied to communications in a WCDMA system, it will be readily apparent to a person of ordinary skill in the art how to apply the invention in similar situations where data and control information is to be transmitted in frames at varying spreading factors.

From the above description, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, the advance transmission of control information presented in one embodiment described here can be used in varying other transmission parameters besides spreading factor, such as data rate or frame format. Also, for example, the exact location of the symbol level buffer in the transmitter may differ from the location presented in one embodiment described here. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a method and system for data and voice transmission over shared and dedicated channels has been described.

What is claimed is:

1. A method for transmitting first and second signals in a code division multiple access system, comprising:
   providing a plurality of frames of data for different users in said second signal;
   providing in said first signal access information for accessing relevant frames from said plurality of frames by each of said users, the access information comprising spreading factor information;
   providing first and second coded downlink channels, said second coded downlink channel being a shared channel by said users;
   transmitting said first signal via said first coded downlink channel;
   delaying a start of said second signal on the second coded downlink channel by a delay sufficient for the spreading factor information to be extracted from a portion of said first signal by a receiving device prior to reception of a first data frame of said second signal, the spreading factor information being associated with the first data frame of the second signal, to avoid chip level signal buffering by the receiving device;
   encoding the second signal after the delaying; and
   transmitting said encoded second signal via said second coded downlink channel after said delay so that a first frame of data of said plurality of frames is transmitted on the second coded downlink channel after access information corresponding to said first frame of data is transmitted on the first coded downlink channel.

2. The method as in claim 1 further including spreading said second signal at chip level prior to said transmitting said encoded second signal via said second coded downlink channel and wherein said access information in said first signal comprises the spreading factor information for accessing said second signal.

3. The method as in claim 2 wherein said transmitting said second signal includes transmitting said plurality of frames comprising user data and wherein each of said plurality of frames includes a different spreading factor.

4. The method as in claim 2 wherein said system is a wideband code division multiple access (WCDMA) system, said first coded downlink channel being a dedicated physical channel (DPCH), and said second coded downlink channel being a physical downlink shared channel (PDSCH) in said WCDMA system.

5. The method as in claim 1, wherein:
said plurality of frames each comprise a plurality of slots; and said delay is equal to three to eighteen slots.

6. An apparatus for transmitting first and second signals in a code division multiple access system, comprising:
a transmitter configured to:
provide a plurality of frames of data for different users in said second signal;
provide in said first signal access information for accessing relevant frames from said plurality of frames by each of said users, the access information comprising spreading factor information;
provide first and second coded downlink channels, said second coded downlink channel being a shared channel by said users;
transmit said first signal via said first coded downlink channel;
delay a start of said second signal on the second coded downlink channel by a delay sufficient for the spreading factor information to be extracted from a portion of said first signal by a receiving device prior to reception of a first data frame of said second signal, the spreading factor information being associated with the first data frame of the second signal, to avoid chip level signal buffering by the receiving device;
encode the second signal after the delaying; and
wherein said transmitter is further configured to transmit said encoded second signal via said second coded downlink channel after said delay so that a first frame of data of said plurality of frames is transmitted on the second coded downlink channel after access information corresponding to said first frame of data is transmitted on the first coded downlink channel.

7. The apparatus as in claim 6, wherein said transmitter is further configured to spread said second signal at chip level before transmitting said encoded second signal via said second downlink coded channel and wherein said access information comprises the spreading factor information for accessing said second signal.

8. The apparatus as in claim 7, wherein said transmitter is further configured to transmit said plurality of frames which comprise user data and wherein each of said plurality of frames includes a different spreading factor.

9. The apparatus as in claim 7 wherein said system is a wideband code division multiple access (WCDMA) system, said first coded downlink channel being a dedicated physical channel (DPCH), and said second coded downlink channel being a physical downlink shared channel (PDSCH) in said WCDMA system.

10. The apparatus of claim 6, wherein:
said plurality of frames each comprise a plurality of slots; and
said delay is equal to three to eighteen slots.

11. A transmitter for transmitting a plurality of frames of data, the transmitter configured to receive input from a plurality of users and allocate and schedule access to communication channels among the plurality of users, comprising:
a symbol-level buffer configured to create a delay between a first and a second signal contained within the input of at least one of the plurality of users, wherein the first signal comprises access information for accessing relevant frames of data from the plurality of frames of data, the access information comprising spreading factor information, and wherein said delay is sufficient for the spreading factor information to be extracted from a portion of said first signal by a receiving device prior to reception of a first data frame of said second signal, the spreading factor information being associated with the first data frame of the second signal, to avoid chip level signal buffering by the receiving device;
an encoder directly coupled to the symbol-level buffer for encoding the first signal and for encoding the second signal after the delay between the first signal and the second signal;
a Walsh cover coupled to the encoder that spreads the first and second signals with selected Walsh codes; and
an air interface coupled to the Walsh cover for transmitting said first signal via a first downlink channel and said encoded second signal via a second downlink channel, wherein said second signal is transmitted via the second downlink channel after said delay, so that a first frame of data of said plurality of frames is transmitted on the second coded downlink channel after access information corresponding to said first frame of data is transmitted on the first coded downlink channel.

12. The transmitter as in claim 11, wherein the first signal comprises access information for accessing relevant frames of the plurality of frames associated with at least one user of the plurality of users.

13. The transmitter as in claim 12, wherein the access information comprises the spreading factor information.

14. The transmitter as in claim 11, wherein the transmitter is operable in a wideband code division multiple access (WCDMA) system, said first downlink channel is a dedicated physical channel (DPCH), and said second coded downlink channel is a physical downlink shared channel (PDSCH).

15. The transmitter of claim 11, wherein:
said plurality of frames each comprise a plurality of slots; and
said delay is equal to three to eighteen slots.

16. A method for transmitting first and second signals in a code division multiple access system, comprising:
providing a plurality of frames of data for different users in said second signal;
providing in said first signal access information for accessing relevant frames from said plurality of frames by each of said users, the access information comprising spreading factor information;

providing first and second coded downlink channels, said second coded downlink channel being a shared channel by said users;

transmitting said first signal via said first coded downlink channel;

delaying a start of said second signal on the second coded downlink channel by a delay using a delay module, wherein the delay is sufficient for the spreading factor information to be extracted from a portion of said first signal prior to reception of a first data frame of said second signal by a receiving device, the spreading factor information being associated with the first data frame of said second signal, wherein the portion of said first signal includes information for accessing the first data frame of said second signal;

encoding the second signal after the delaying; and transmitting said encoded second signal via said second coded channel after said delay so that a first frame of data of said plurality of frames is transmitted on the second coded downlink channel after access information corresponding to said first frame of data is transmitted on the first coded downlink channel.

17. An apparatus for transmitting first and second signals in a code division multiple access system, comprising a transmitter configured to:

provide a plurality of frames of data for different users in said second signal;

provide in said first signal access information for accessing relevant frames from said plurality of frames by each of said users, the access information comprising spreading factor information;

provide first and second coded downlink channels, said second coded downlink channel being a shared channel by said users;

transmit said first signal via said first coded downlink channel;

delay a start of said second signal on the second coded downlink channel by a delay using a delay module, wherein the delay is sufficient for the spreading factor information to be extracted from a portion of said first signal prior to reception of a first data frame of said second signal by a receiving device, the spreading factor information being associated with the first data frame of said second signal, wherein the portion of said first signal includes information for accessing the first data frame of said second signal;

encode the second signal after the delaying; and transmit said encoded second signal via said second coded channel after said delay so that a first frame of data of said plurality of frames is transmitted on the second coded downlink channel after access information corresponding to said first frame of data is transmitted on the first coded downlink channel.

18. A transmitter for transmitting a plurality of frames of data, the transmitter configured to receive input from a plurality of users and allocate and schedule access to communication channels among the plurality of users, comprising:

a symbol-level buffer that creates a delay between a first and a second signal contained within the input of at least one of the plurality of users, wherein the first signal comprises access information for accessing relevant frames of data from the plurality of frames of data, the access information comprising spreading factor information, and wherein said delay is sufficient for the spreading factor information to be extracted from a portion of said first signal prior to reception of a first data frame of said second signal by a receiving device, the spreading factor information being associated with the first data frame of said second signal, wherein the portion of said first signal includes information for accessing the first data frame of said second signal;

an encoder directly coupled to the symbol-level buffer for encoding the first signal and for encoding the second signal after the delay between the first signal and the second signal;

a Walsh cover coupled to the encoder that spreads the first and second signals with selected Walsh codes; and an air interface coupled to the Walsh cover for transmitting said first signal via a first downlink channel and said encoded second signal via a second downlink channel, wherein said second signal is transmitted via the second downlink channel after said delay, so that a first frame of data of said plurality of frames is transmitted on the second coded downlink channel after access information corresponding to said first frame of data is transmitted on the first coded downlink channel.

* * * * *